United States Patent
Wu et al.

(10) Patent No.: US 9,031,367 B2
(45) Date of Patent: May 12, 2015

(54) OPTICAL ELEMENT PACKAGE AND MANUFACTURING METHOD THEREOF

(75) Inventors: Kai-Wen Wu, New Taipei (TW); Tai-Cherng Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/598,822

(22) Filed: Aug. 30, 2012

(65) Prior Publication Data
US 2013/0142484 A1 Jun. 6, 2013

(30) Foreign Application Priority Data

Dec. 1, 2011 (TW) .............................. 100144182 A

(51) Int. Cl.
| G02B 6/12 | (2006.01) |
| G02B 6/30 | (2006.01) |
| G02B 6/36 | (2006.01) |
| G02B 6/42 | (2006.01) |

(52) U.S. Cl.
CPC ......... *G02B 6/4214* (2013.01); *Y10T 29/49826* (2015.01); *G02B 6/3652* (2013.01); *G02B 6/3636* (2013.01); *G02B 6/30* (2013.01); *G02B 6/4246* (2013.01); *G02B 6/423* (2013.01); *G02B 6/4249* (2013.01)

(58) Field of Classification Search
CPC ...... G02B 6/30; G02B 6/3636; G02B 6/3652; G02B 6/4214; G02B 6/4246; G02B 6/4249; G02B 6/423
USPC ............... 385/14, 32, 49–50, 88, 90, 92, 126, 385/139; 438/31; 29/428
See application file for complete search history.

(56) References Cited

U.S. PATENT DOCUMENTS 7,630,593 B2 * 12/2009 Furuno et al. ................... 385/14
2012/0057822 A1 * 3/2012 Wu et al. ......................... 385/49

* cited by examiner

*Primary Examiner* — Akm Enayet Ullah
*Assistant Examiner* — Michael Mooney
(74) *Attorney, Agent, or Firm* — Novak Druce Connolly Bove + Quigg LLP

(57) ABSTRACT

An optical element package includes an optical wave guide array, at least one optical assembly and at least one optical transmission member. The optical wave guide array has a reflection groove. The reflection groove includes a reflection surface. The at least one optical assembly is positioned on the optical wave guide array adjacent to the reflection surface. The at least one optical transmission member is positioned on the optical wave guide array, and is optically coupled with the reflection surface. The optical signals emitted by the at least one optical assembly are reflected by the reflection surface and then reaching the at least one optical transmission member for transmission.

11 Claims, 3 Drawing Sheets

OPTICAL ELEMENT PACKAGE AND MANUFACTURING METHOD THEREOF

BACKGROUND

1. Technical Field

The present disclosure relates to package structures, and particularly, to an optical element package and an optical element package manufacturing method.

2. Description of Related Art

In optical communication, optical emitting elements are used to convert electrical signals to optical signals, and optical receiving elements are used to convert optical signals to electrical signals. The chip on board (COB) method is one technique to package the optical elements. Lenses need to be optically coupled with the optical elements during the package process. After performing the die bonding of the optical elements, the lenses need to cover the optical elements precisely. However, the positions of the lenses are easily misaligned to be inclined. Thus, it is difficult to optically couple the lenses and the optical elements precisely. In addition, the number of the optical elements will be increased with the demand of the higher data transmission. The difficulty of arrangement of the optical elements and the lenses will be increased during the COB process.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
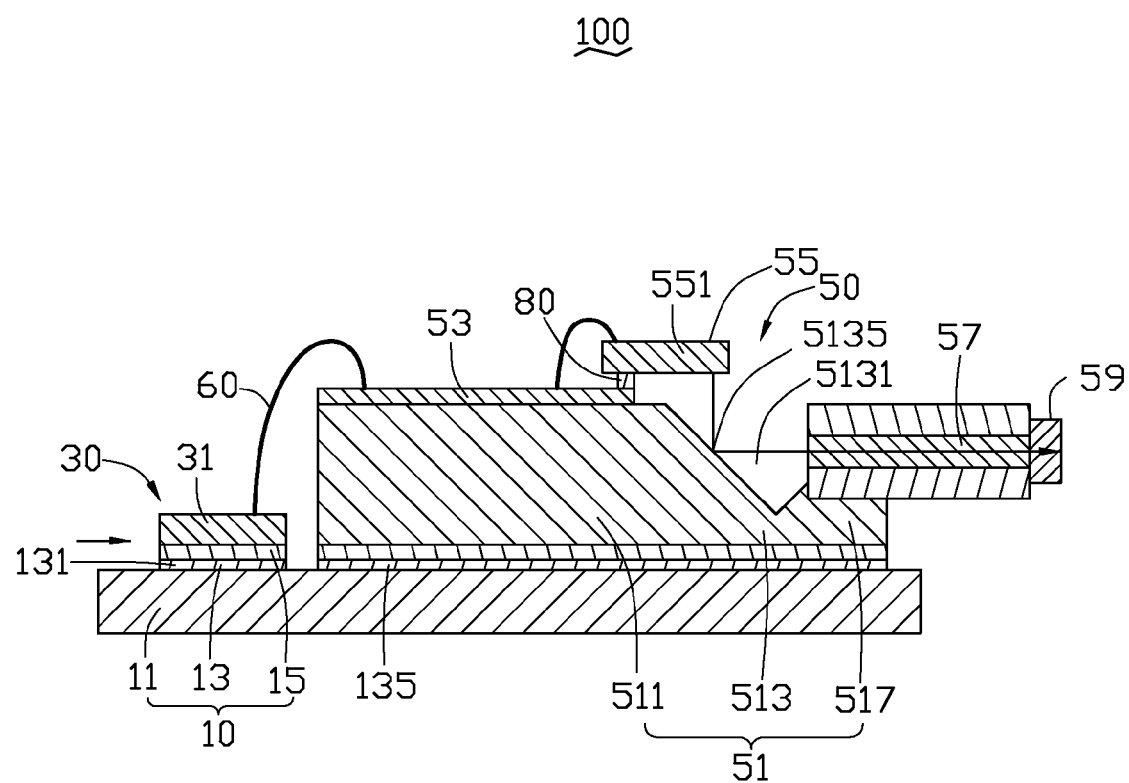
FIG. 1 is a cross-section of an embodiment of an optical transmission module.
Figure 2:
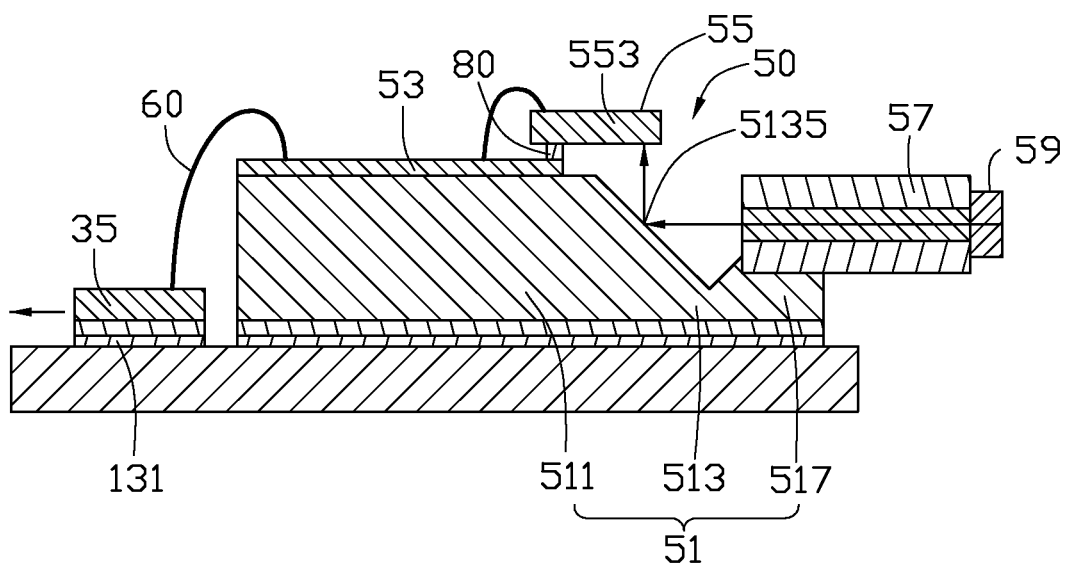
FIG. 2 is a cross-section of the embodiment of the optical transmission module from another aspect.

FIGS. 1 and 2 show an embodiment of an optical transmission module 100. The optical transmission module 100 is used for converting and transmitting electrical signals and optical signals. The optical transmission module 100 includes a substrate 10, at least one electrical module 30 and an optical element package 50. The electrical module 30 and the optical element package 50 are positioned on the substrate 10 and electrically connected with each other.

The substrate 10 supports the electrical module 30 and the optical element package 50. The substrate 10 includes a base board 11, a plurality of pads 13, and a plurality of fixing layers 15. The base board 11 can be made of insulation material, such as resin, or glass, for example. The base board 11 also can be made of electrically conductive materials, but an outer surface of the substrate 10 is required to be covered by an insulation layer. The pads 13 are usually copper foil, and include a plurality of first pads 131 and a plurality of second pads 135. The first pads 131 and the second pads 135 are positioned on the base board 11 and spaced from each other. The fixing layers 15 are covered on the first pads 131 and the second pads 135. In the illustrated embodiment, the fixing layers 15 are adhesive layers activated by heat radiation.

The at least one electrical module 30 is positioned on the first pads 131 via the fixing layers 15. Each electrical module 30 includes a first electrical element 31 (as shown in FIG. 1) and a second electrical element 35 (as shown in FIG. 2). The first electrical element 31 and the second electrical element 35 are positioned on the fixing layer 15 side by side. In the illustrated embodiment, the first electrical element 31 is an integrated circuit board. The second electrical element 35 is a trans-impedance amplifier.

The optical element package 50 is positioned on the second pads 135 via the fixing layers 15, and is adjacent to the electrical module 30. The optical element package 50 includes an optical wave guide array 51, a conductive layer 53, at least one optical assembly 55, at least one optical transmission member 57 and a plurality of optical fibers 59.

The optical wave guide array 51 is positioned on one second pad 135 via the fixing layer 15 for transmitting optical signals. The optical wave guide array 51 includes a mounting portion 511, a reflection portion 513 and an installation portion 517. The mounting portion 511 is positioned adjacent to the electrical module 30. The reflection portion 513 is defined between the mounting portion 511 and the installation portion 517. A V-shaped reflection groove 5131 is defined in the reflection portion 513. One surface of the reflection groove 5131 adjacent to the mounting portion 511 is a reflection surface 5135 for changing the transmission direction of the optical signals. The installation portion 517 is positioned on an end of the reflection portion 513 away from the reflection surface 5135. A height of the installation portion 517 is less than that of the mounting portion 511. In the illustrated embodiment, an angle of incline of the reflection groove 5131 is 90 degrees; the optical wave guide array 51 is made of silicon. In other embodiments, the reflection groove 5131 may be in other shapes, such as an arc of 90 degrees, just so long as the optical signals reflected by the reflection surface 5135 is capable of arriving at the optical transmission members 57 or a plurality of optical receiving elements 553.

The conductive layer 53 is formed on the mounting portion 511 for electrically connecting the at least one electrical module 30 and the at least one optical assembly 55. A conductive connecting wire 60 is formed at one end of the conductive layer 53 via wire bonding to electrically connect with the electrical module 30. In the illustrated embodiment, the conductive layer 53 is a transmission wire.

The at least one optical assembly 55 is positioned on the conductive layer 53 adjacent to the reflection surface 5135 and parallel to the substrate 10. Each optical assembly 55 includes an optical emitting element 551 (as shown in FIG. 1) and an optical receiving element 553 (as shown in FIG. 2). The optical emitting element 551 and the optical receiving element 553 are positioned on the conductive layer 53 side by side via flip-chip process. The optical emitting element 551 is used corresponding to the first electrical element 31, for converting the electrical signal from the first electrical element 31 to optical signals. Optical signals emitted by the optical emitting element 551 are traveling vertically with respect to the base board 11. The optical receiving element 553 is used corresponding to the second electrical element 35, for receiving the optical signals from the optical transmission member 57 and converting the optical signals to electrical signals. In the illustrated embodiment, the optical emitting element 551 is a vertical cavity surface emitting laser, which is electrically connected with the conductive layer 53 via the wire bond; the optical receiving element 553 is a photo diode, which is electrically connected with the conductive layer 53.

The at least one optical transmission member 57 is positioned on the installation portion 517, and parallel to the substrate 10. Each optical transmission member 57 is optically coupled with the reflection surface 5135 at one end thereof for transmitting the optical signals. Optical fibers 59 are optically coupled with another end of the optical transmission member 57 for long distance transmission.

When the first electrical element 31 sends the electrical signals to the optical emitting element 551. The optical emitting element 551 converts the electrical signals to optical signals. The optical emitting element 551 emits optical signals vertically to the substrate 10. The optical signals are reflected by the reflection surface 5135 and changing transmitting direction thereof. The optical signals enter the optical transmission member 57 and finally arrive at the optical fiber 59 for long distance transmission.

When the optical fiber 59 receives the optical signals. The optical signals will reach the reflection surface 5135 via the transmission of the optical transmission member 57. The optical receiving element 553 receives and converts the optical signals reflected by the reflection surface 5135 to the electrical signals. Then the electrical signals are transmitted to the second electrical element 35 by the optical receiving element 553.

Figure 3:
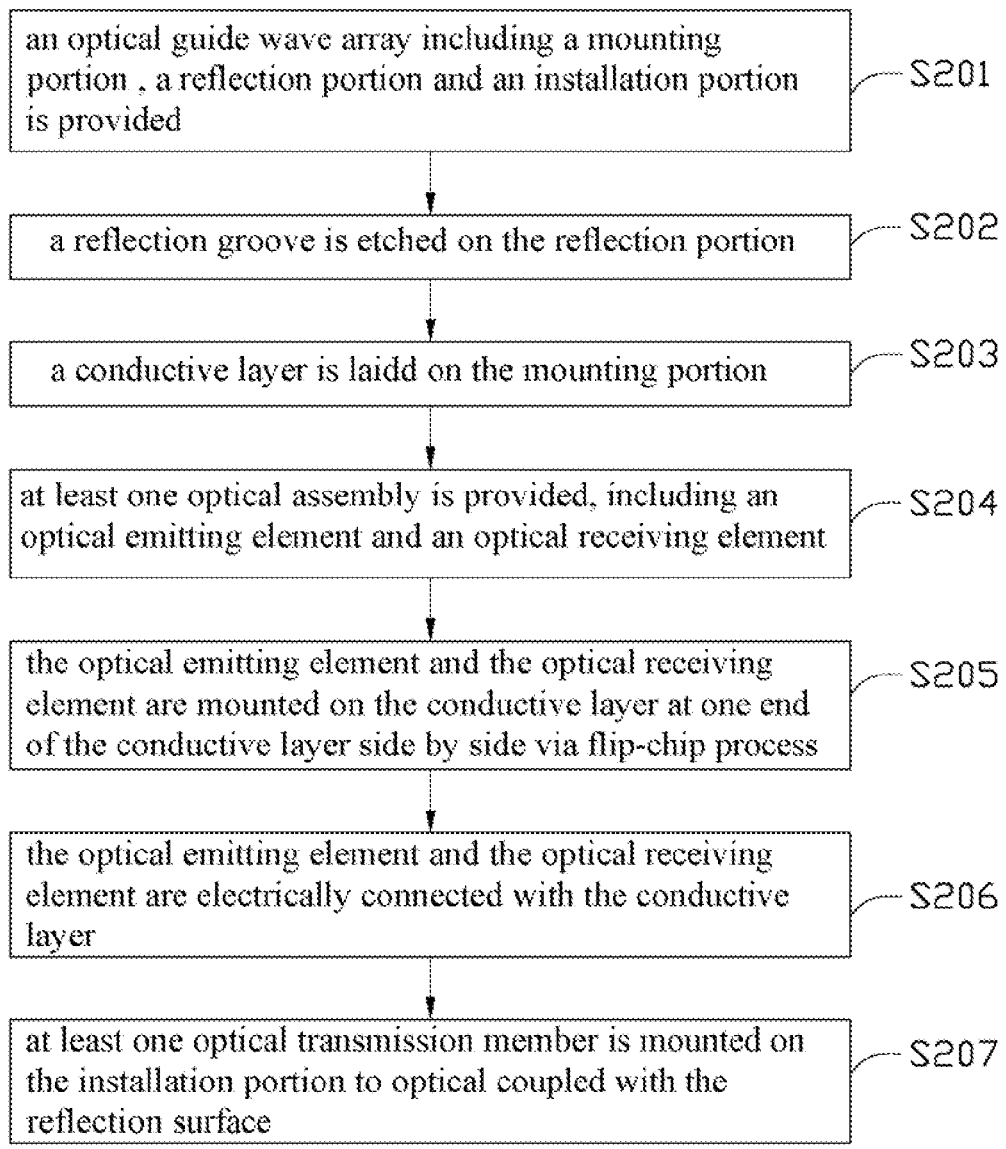
FIG. 3 is a flow chart of a manufacturing method of an optical element package.

FIG. 3 is an illustrated embodiment of a manufacturing method for manufacturing the optical element package 50, the optical element package manufacturing method including the following steps.

In step S301, an optical wave guide array 51 is provided. The optical wave guide array 51 includes a mounting portion 511, a reflection portion 513 and an installation portion 517. The reflection portion 513 is positioned between the mounting portion 511 and the installation portion 517. A height of the installation portion 517 is less than that of the mounting portion 511.

In step S302, a V-shaped reflection groove 5131 is etched on the reflection portion 513. One surface of the reflection groove 513 adjacent to the mounting portion 511 is a reflection surface 5135. In the illustrated embodiment, the angle of incline of the reflection groove 5131 is 90 degrees; the optical wave guide array 51 is made of silicon.

In step S303, a conductive layer 53 is laid on the mounting portion 511.

In step S304, at least one optical assembly 55, including an optical emitting element 551 and an optical receiving element 553, is provided.

In step S305, the optical emitting element 551 and the optical receiving element 553 of one optical assembly 55 are mounted on the conductive layer 53 at one end of the conductive layer 53 via flip-chip process side by side.

In step S306, the optical emitting element 551 is electrically connected with the conductive layer 53 via wire bond, and the optical receiving element 553 is electrically connected with the conductive layer 53.

In step S307, at least one optical transmission member 57 is provided and mounted on the installation portion 517 to optically couple with the reflection surface for transmitting the optical signals.

The optical transmission module 100 is capable of transmitting information in two directions for long distance. The reflection groove 5131 including a reflection surface 5135 is formed on the optical wave guide array 51. The optical emitting element 551 and the optical receiving element 553 are positioned on the conductive layer 53 adjacent to the reflection surface 5135 side by side via flip-chip process. The optical signals are reflected by the reflection surface 5135 to change the transmission direction. There is no lens in the optical element package 50 and the structure of the optical element package 50 is simple. Therefore, even when the number of the optical emitting elements 551 and the optical receiving elements 553 are increased, the accuracy of the alignment of the optical emitting element 551, the optical receiving element 553 and the optical wave guide array 51 are easy to achieve.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An optical element package, comprising:
   an optical wave guide array comprising a mounting portion, a reflection portion and an installation portion, the reflection portion positioned between the mounting portion and the installation portion, a reflection groove defined in the reflection portion, the reflection groove defining a reflection surface adjacent to the mounting portion;
   a conductive layer formed on an upper surface of the mounting portion;
   at least one optical assembly positioned on the conductive layer adjacent to the reflection surface;
   at least one optical transmission member positioned on an upper surface of the installation portion and optical coupled with the reflection surface; and
   a plurality of optical fibers;
   wherein a plurality of optical signals emitted by the at least one optical assembly are reflected by the reflection surface and reaching and entering the at least one optical transmission member, and finally arriving at the optical fibers for transmission, and a height of the upper surface of the installation portion is less than that of the upper surface of the mounting portion.

2. The optical element package of claim 1, wherein the reflection groove is V-shaped, and the angle of incline of the reflection groove is 90 degrees.

3. The optical element package of claim 1, wherein each optical assembly comprises an optical emitting element and an optical receiving element, the optical emitting element and the optical receiving element are positioned on the conductive layer side by side, the optical emitting element converts the electrical signals to the optical signals and emits the optical signals to the reflection surface, and the optical receiving element receive the optical signals from the reflection surface and converts the optical signals to the electrical signals.

4. The optical element package of claim 3, wherein the optical emitting element and the optical receiving element are positioned on the conductive layer via the flip-chip process.

5. An optical transmission module, comprising:
   a substrate;
   at least one electrical module positioned on the substrate;
   an optical element package positioned on the substrate spaced from the at least one electrical module, comprising:
   an optical wave guide array comprising a mounting portion, a reflection portion and an installation portion, the reflection portion positioned between the mounting portion and the installation portion, a reflection groove defined in the reflection portion, the reflection groove comprising a reflection surface adjacent to the mounting portion;
   a conductive layer formed on an upper surface of the mounting portion;
   at least one optical assembly positioned on the conductive layer adjacent to the reflection surface, and electrically connected with the at least one electrical module for converting the optical and electrical signals; and at least one optical transmission member positioned on an upper surface of the installation portion and optically coupled with the reflection surface;

wherein the optical signals emitted by the at least one optical assembly are reflected by the reflection surface and reaching the at least one optical transmission member for transmission, and a height of the upper surface of the installation portion is less than that of the upper surface of the mounting portion.

6. The optical element package of claim 5, wherein the substrate comprises a base board, a plurality of first pads, a plurality of second pads, and a plurality of fixing layers, the first pads and the second pads are positioned on the base board and spaced from each other, the fixing layers are covered on the first pads and the second pads, the least one electrical module is positioned on the first pads via the fixing layers, and the optical element package is positioned on the second pads via the fixing layers.

7. The optical transmission module of claim 6, wherein the reflection groove is V-shaped, and the angle of incline of the reflection groove is about 90 degrees.

8. The optical transmission module of claim 6, wherein each optical assembly comprises an optical emitting element and an optical receiving element, the optical emitting element and the optical receiving element are positioned on the conductive layer side by side, the optical emitting element converts the electrical signals to the optical signals and emits the optical signals to the reflection surface, and the optical receiving element receive the optical signals from the reflection surface and converts the optical signals to the electrical signals.

9. The optical element package of claim 8, wherein the optical emitting element and the optical receiving element are positioned on the conductive layer via the flip-chip process.

10. The optical element package of claim 6, further comprising a conductive connecting wire, wherein one end of the conductive connecting wire is electrically connected to the electrical module, and the other end of the conductive connecting wire is electrically connected to the conductive layer.

11. The optical element package of claim 6, wherein the fixing layers are adhesive layers activated by heat radiation.

* * * * *